United States Patent [19]
Arndt et al.

[11] 4,386,044
[45] May 31, 1983

[54] METHOD OF FORMING A CUP-LIKE CONTAINER

[75] Inventors: Carl Arndt, Wauconda; Martin Mueller, Wonderlake, both of Ill.

[73] Assignee: Owens-Illinois, Inc., Toledo, Ohio

[21] Appl. No.: 279,911

[22] Filed: Jul. 2, 1981

Related U.S. Application Data

[62] Division of Ser. No. 92,893, Nov. 9, 1979, Pat. No. 4,279,585.

[51] Int. Cl.$^3$ ............................................. B29C 13/00
[52] U.S. Cl. ................................ 264/230; 264/296; 264/321; 264/342 R; 264/DIG. 66
[58] Field of Search ........... 264/230, 296, 321, 342 R, 264/DIG. 66; 425/403, 393

[56] References Cited
U.S. PATENT DOCUMENTS 4,156,710 5/1979 Carroll et al. ..................... 264/296
4,281,979 8/1981 Doherty et al. ..................... 264/230

Primary Examiner—Donald E. Czaja
Assistant Examiner—W. Thompson
Attorney, Agent, or Firm—John R. Nelson; Myron E. Click

[57] ABSTRACT

A method of making a one-piece container of heat shrinkable thermoplastic foam from sheet stock in which a longitudinally seamed cylindrical sleeve made from such material is placed on a forming mandrel providing the essential shape of the container. An end portion of the sleeve extends cantilever fashion beyond the mandrel. The sleeve is heated to soften it and shrink partially to conformity of the mandrel and shrink to a small elongate tube a fraction of the sleeve's original diameter. The heat softened sleeve is pressed against the bottom end of the mandrel to form a container bottom, and at the same time the other opposite end of the sleeve is upset to form a bead for the container opposite the bottom end.

2 Claims, 6 Drawing Figures

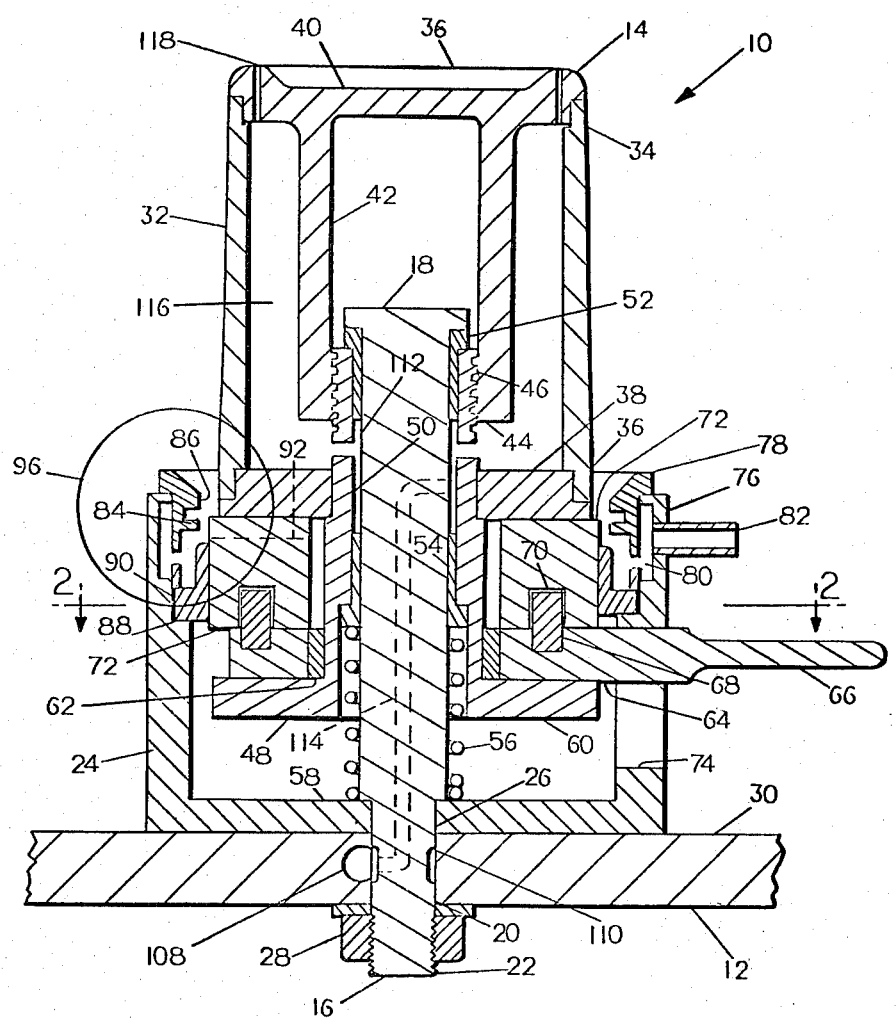
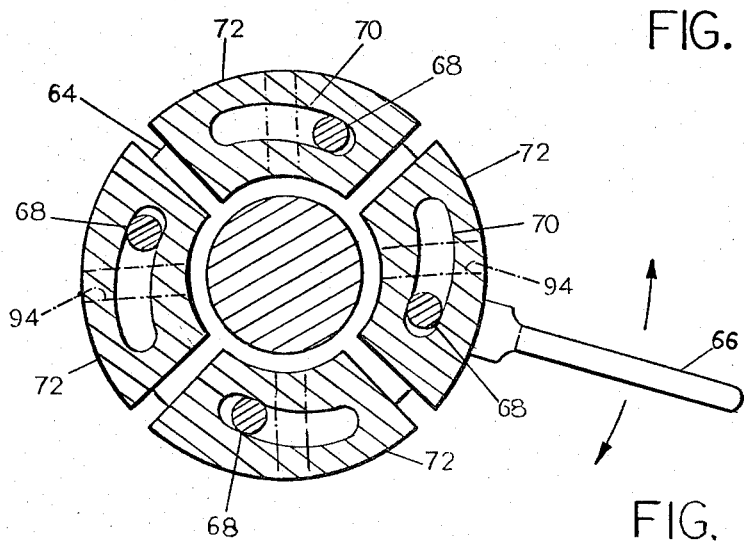
FIG. 1
FIG. 2

METHOD OF FORMING A CUP-LIKE CONTAINER

This is a division of application Ser. No. 092,893, filed Nov. 9, 1979, now U.S. Pat. No. 4,279,585, issued July 21, 1981.

BACKGROUND OF THE INVENTION

The present invention relates generally to containers such as cups and the like manufactured of plastic material. In particular, the present invention relates to the manufacture of one-piece foam sheet material cups. For some time cups have been manufactured of expanded polystyrene beads by the well-known steam chest process. This method of cup manufacture has the inherent disadvanatage in that each container, if so desired, must be individually decorated by an elaborate and time consuming process. It was then discovered that oriented foam sheet material could be produced and decorated on one side similar to and by techniques used in the paper decorating industry. The decorated foam sheet material was then cut into rectangular shaped blanks which were then rolled into cylinders containing a single side seam. The cylinders were then placed on a mandrel with a portion of the cylinder protruding beyond the mandrel. The mandrel and the plastic foam sheet stock cylinder which it contained were then subjected to heat which in turn caused the foam sheet cylinder to shrink to the external configuration of the mandrel. A separate bottom closure has been used with the foam sheet cylinder to produce a two-piece container. Also, a one-piece cup has been produced by merely pressing the extra material, that protrudes beyond the mandrel into a bottom structure. After the containers, such as cups for beverages, were produced by the above described method, the cups were then subjected to a separate rimming process which produced the familiar bead on the rim of the cup.

SUMMARY OF THE INVENTION

The present invention sets forth a mandrel for shrink forming a plastic container that is generally of cylindrical configuration. The mandrel is adapted for the reception of a preformed cylindrical sleeve of properly oriented foam sheet material. The mandrel comprises a centrally positioned column adapted for attachment to a base member. A slide member is positioned in telescoping arrangement on the exterior of the central support column. A sleeve is attached to the slide member along with a plurality of radially movable segments that expand the top edge of the container. The sleeve, the movable segments and the container are then moved in a longitudinal direction with respect to the centrally positioned column, thus causing the rim of the container to be upset into a bead.

BRIEF DESCRIPTION OF THE DRAWINGS

FIG. 1 is a sectional view of the apparatus of the present invention.

FIG. 2 is a sectional view taken along the line 2—2 of FIG. 1.

THE PREFERRED EMBODIMENT

Figure 3:
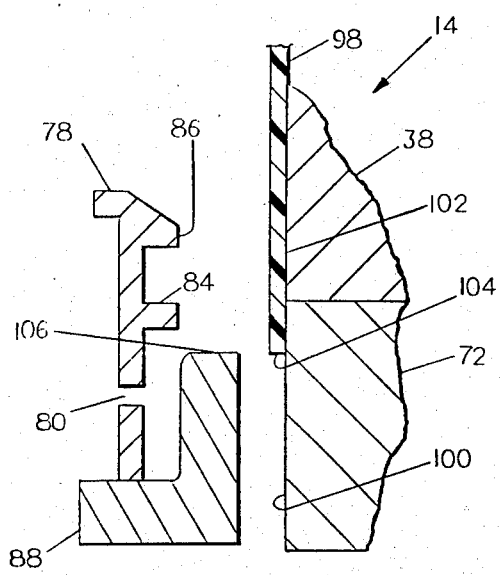
FIG. 3 is an enlarged sectional view of that portion represented by numeral 96 of FIG. 1.

The apparatus for the manufacture of a container from a foam sleeve is shown generally at 10 in FIG. 1. A base 12 is provided for the support of the mandrel 14 and its associated mechanism. The base mechanism can be, for example, a drum assembly or conveyor system that permits mobility of the mandrel assembly. Since the container will be partially formed by the shrinkage of the foam material, it is desirable that the mandrel pass through a heated zone such as an oven. A support column 16 is cantilevered normal to base plate 12 and as shown for convenience in an upright position in FIG. 1. Support column 16 contains a flanged head 18 at its free end and a reduced diameter 20 at its threaded end 22. A hollow cylindrically shaped support post 24 contains a centrally positioned bore 26 through which the reduced diameter 20 of support column 16 is inserted. As nut 28 is tightened, support post 24 is clamped firmly against the top surface 30 of base 12. Thus, base 12, support column 16 and hollow support post 24 are in fixed relationship with one another and do not move as does the remainder of mandrel 14 and its associated parts which are described below.

Mandrel 14 is adapted for movement along support column 16 as described in detail. Mandrel 14 comprises a cylindrical section 32 which is supported at both ends. The top end 34 coacts with end plate 36 and bottom plate 38. The top end plate 36 contains an end closure that is recessed as at 40. This particular recess provides room for the formation of the bottom structure of a cup. If the bottom of the cup or container is not recessed, it will not always maintain its stability when it sits on a surface that is not exactly planar. A tubular section 42 is formed as an integral part of top end plate 36. Tubular section 42 is generally concentric with the cylindrical section 32 of mandrel 14, although the exterior of section 32 may in some instances have a slight taper to facilitate the removal of completed containers from the mandrel. The interior bottom end 44 contains an internally threaded bore 46 that is adapted for engagement with similar threads on slide column 48. Thus it is possible to not only disengage cylindrical section 32 from the remaining portion of mandrel 14, but it is also an added advantage to be able to quickly change the cylindrical section 32 to a longer or shorter piece without entirely dismantling or replacing the overall assembly 10. Slide column 48 contains a centrally positioned through bore 50 that has an internal diameter of greater extent than the outer diameter of support column 16. A top slide bearing 52 is press fitted into the centrally positioned bore 50 of slide column 48. A similar bottom slide bearing 54 is also press fitted into the lower section of slide column 48. Thus it can be observed that bearings 52 and 54 permit slide column 48 to move up and down while being guided by the outer surface of support column 16. Slide column 48 is biased in an upward position by the influence of compression spring 56 which is positioned around support column 16 so that it abuts against and extends from the lower end of slide bearing 54 to the top inside surface 58 of hollow support post 24. The lower end of slide column 48 contains a radilly outwardly extending flange 60. A cylindrical spacer bushing 62 is pressed over the exterior of slide column 48 and in abutting relationship with the top surface of outwardly extending flange 60. A cam disc 64 is positioned in circumferentially sliding engagement with the outer surface of spacer bushing 62. The cam disc also has its bottom surface resting on the top surface of outwardly extending flange 60. A handle 66 is attached to cam disc 64 so that cam disc 64 can be rotated in either direction about spacer bushing 62. A series of cam pins 68 are circumferentially spaced around cam disc 64. The cam pins 68 protrude in an upward direction and coact with cam following tracks 70 which are positioned in radially outwardly movable segments 72. It can be determined from the description set forth supra that slide column 48 moves up and down along support column 16 and also supports movable segments 72 which are adapted for movement in a radial direction.

Attention is once again directed to hollow support post 24. A cut-out 74 is provided so that handle 66 can move freely up and down with mandrel 14. The free cylindrical end of hollow support post 24 contains an internally cylindrical cavity 76 that is bounded on its interior side by air distribution ring 78. Air distribution ring 78 not only forms the interior wall of cavity 76, but it also provides the means for air egress from cavity 76. Small air holes 80 permit a continuous flow of radially inwardly directed cooling air to flow from cavity 76. An air infeed line 82 provides the air supply to cylindrical cavity 76. The radially inward cylindrical extent of air distribution ring 78 contains two concentrically positioned baffle rings 84 and 86. The spaces provided between and adjacent to baffle rings 84 and 86 create a turbulent flow of air just after the air has exited air holes 80. It is to be understood that the size and spacing of holes 80 can be varied so as to provide equal heating around the arcuate extent of air distribution ring 78.

An abutment ring 88 is supported on a ledge formed on the interior of hollow support post 24. The abutment ring 88 is free to float in a radial direction through the extent provided for by gap 90. The vertical freedom of abutment ring 88 is restrained by the bottom of air distribution ring 78.

FIG. 2 is a sectional view taken along the lines 2—2 of FIG. 1. FIG. 2 shows the movable segments 72 and the arcuate cam following tracks 70 that are formed into the lower bottom half of each segment. Cam pins 68 are shown in engagement with cam following tracks 70. The cam disc 64 which supports cam pins 68 is shown beneath the movable segments 72. The bottom plate 38 contains a plurality of radially oriented slide bars 92 which protrude in a downward direction from the lower surface of bottom plate 38. Slide bar 92 can be best seen in FIG. 1. Each movable segment 72 contains a radially milled groove 94 in its top surface that coacts with slide bar 92. The position of groove 94 is shown in FIG. 2 although it is apparent that groove 94 is in a position above section 2—2. As each movable segment 72 is cammed radially outward and inward under the influence of cam disc 64 and its attached cam pins 68, the movable segments 72 all keep their alignment and move only in a radial direction as desired.

FIG. 3 is a enlarged fragmentary view of that area shown in circle 96 on FIG. 1. The top sidewall of an inverted foam plastic container 98 is shown in position over the mandrel 14 and bottom plate 38. The movable segments 72, described heretofore, are in their radially inward position, thus their cylindrical outer surface 100 is flush with the outer edge surface 102 of bottom plate 38.

The leading or top end 104 of container 98 is positioned so that it overlaps the outer surface of movable segment 72. Care is exercised to assure that edge 104 does not extend lower than the top surface 106 of abutment ring 88. As the top end 104 of container 98 is positioned on mandrel 14, it is subjected to heated air exiting from air holes 80. The heat softened end 104 is then ready for radial expansion.

Figure 4:
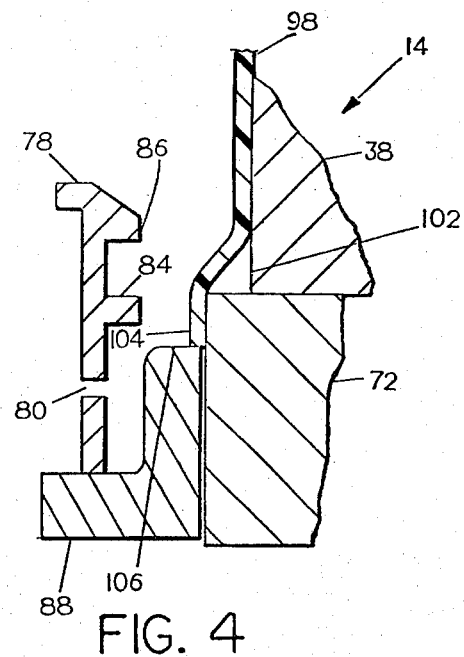
FIG. 4 is a view similar to FIG. 3 which shows the segments in an outward position.

FIG. 4 is a view similar to FIG. 3 except that movable segments 72 have been moved to their radially outermost position, thus causing end 104 of container 98 to increase in diameter. At this time, hot air is being directed by baffle rings 84 and 86 toward end 104 and its immediate area. The end 104, in its radially expanded position, is in abutment with the top surface 106 of abutment ring 88.

Figure 5:
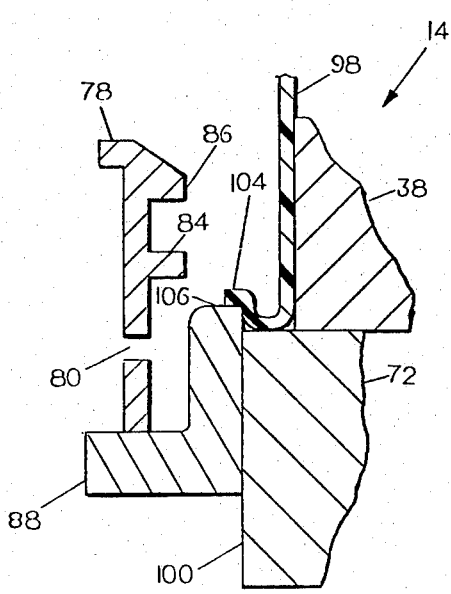
FIG. 5 is a view similar to FIG. 4 that shows the downward movement of the mandrel sleeve.

FIG. 5 is a view similar to FIG. 4 except that the entire mandrel 14 assembly has begun its downward movement, thus compressing compression spring 56 which is depicted in FIG. 1. Since the end 104 of container 98 is in abutment with the top surface of abutment ring 88, it begins to bend or curl outwardly and back against the sidewall of container 98. Of course, as previously pointed out, abutment ring 88 does not move down with mandrel 14 since it is rigidly supported in a vertical direction by hollow support post 24.

Figure 6:
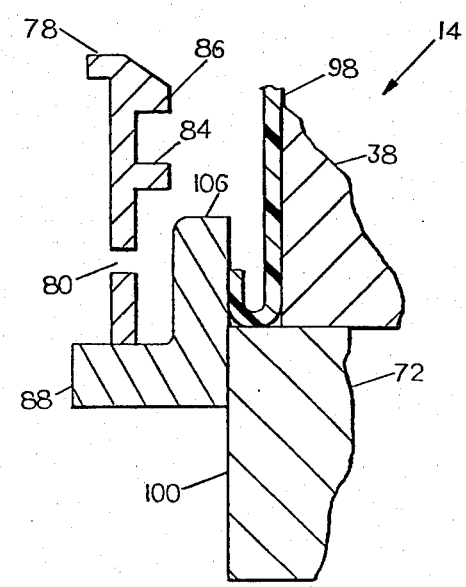
FIG. 6 is a view similar to FIG. 5 wherein the container bead is completely formed.

FIG. 6 is a view similar to FIG. 5, however, the mandrel 14 has moved to its downwardmost position. As mandrel 14 moves downward, the end 104 of container 98 is completely folded back against the sidewall of the container. At this time the hot air from air holes 80 is reduced so that its impingement against the sidewall of the container 98 will not have an adverse effect.

After the rim has been formed on the container 98 as described and shown in FIG. 6, the container is ready for removal from the mandrel 14. Referring once again to FIG. 1, an air source 108 is shown in base 12. The air source 108 is in turn coupled to a concentrically relief cut 110 in the reduced diameter section 20 of support column 16. The air that reaches relief cut 110 via air source 108 communicates with air passage 112 by way of air duct 114. Air passage 112 is formed concentrically around support column 16 and is positioned between top slide bearing 52 and bottom slide bearing 54. Air duct 114 is positioned within the central extent of support column 16. Apertures are placed in the sides of threaded bore 46, thus providing further communication for the air as it progresses from air passage 112 to the space 116 between the inner wall of cylindrical section 32 and the exterior of tubular section 42. Air egress holes 118 are positioned circumferentially around the peripheral extent of the top end plate 36 of mandrel 14. Thus it can be observed that air from air source 108 can be utilized to create a force against the internal surface of a cup bottom, thus ejecting completed cup from the confinement of mandrel 14 once the rim has been completely formed.

In the utilization of the container forming apparatus heretofore described, a cylindrical sleeve of oriented thermoplastic heat shrinkable plastic material is positioned on the mandrel and the leading edge of the sleeve is positioned as previously described and shown in the drawings. A portion of the cylindrical sleeve extends beyond the end of the mandrel and is subjected to a carefully controlled and directed heat source such as hot air. The free end of the sleeve shrinks into a small elongated tube that is but a fraction of the sleeve's original diameter. The sleeve is, while in the heat softened condition, pressed against the bottom of the mandrel to form an end closure on the container.

The mandrel of the present invention is made to telescope upon itself when a force is applied to the free end. Thus, it becomes evident that the rim of the container is formed at the same time that the bottom of the container is pressed.

Thus it becomes apparent that the present invention contemplates not only the apparatus for forming a container, but also the method simultaneously forming the bottom of a one-piece container and also the rim of the container.

The container thus produced by the present apparatus and method has a rim that folds back upon itself, thus providing a reinforcement for the reception of a closure. The rim is essentially two concentric cylindrical sections. The first section is that cylindrical portion of the sidewall near the top of the container and the second section is the cylindrical section of slightly larger diameter positioned next to the first section. The two contiguous sections are, of course, coupled together at the very top of the rim.

What is claimed is:

1. The method of forming a cup-like container rim including the steps of;
   (a) mounting a sleeve of thermoplastic sheet material on a mandrel,
   (b) holding said sleeve in position on said mandrel by exerting a first radial force outwardly against the interior rim edge of said sleeve,
   (c) heating the container rim in the area where it is being held by said radial force,
   (d) expanding the rim area in a radial direction by the application of a second radial force outwardly against the interior rim edge of said sleeve,
   (e) translating the sleeve along its longitudinal axis while holding the expanded rim edge fixed against an abutment ring, and
   (f) causing the rim to upset, thus forming a bead on the container.

2. The method of forming a cup-like container as claimed in claim 1 including the step of;
   (a) continuing the heating of the rim area during the upseting of the rim.

* * * * *